United States Patent
Siria et al.

(10) Patent No.: US 12,390,994 B2
(45) Date of Patent: Aug. 19, 2025

(54) SYSTEM FOR CONTROLLED DEPOSITING OF A FLUID ON A SUBSTRATE

(71) Applicants: PARIS SCIENCES ET LETTRES, Paris (FR); Centre National de la Recherche Scientifique, Paris (FR); Sorbonne Université, Paris (FR); UNIVERSITÉ DE PARIS, Paris (FR)

(72) Inventors: Alessandro Siria, Paris (FR); Antoine Nigues, Paris (FR); Laetitia Jubin, Paris (FR); Lydéric Bocquet, Paris (FR)

(73) Assignees: PARIS SCIENCES ET LETTRES PARIS, Paris (FR); Centre National de la Recherche Scientifique, Paris (FR); Sorbonne Université, Paris (FR); UNIVERSITE DE PARIS, Paris (FR)

( * ) Notice: Subject to any disclaimer, the term of this patent is extended or adjusted under 35 U.S.C. 154(b) by 695 days.

(21) Appl. No.: 17/415,595

(22) PCT Filed: Dec. 17, 2019

(86) PCT No.: PCT/FR2019/053129
§ 371 (c)(1),
(2) Date: Jun. 17, 2021

(87) PCT Pub. No.: WO2020/128310
PCT Pub. Date: Jun. 25, 2020

(65) Prior Publication Data
US 2022/0063192 A1    Mar. 3, 2022

(30) Foreign Application Priority Data
Dec. 18, 2018 (FR) ...................................... 1873249

(51) Int. Cl.
*B29C 64/209* (2017.01)
*B29C 64/255* (2017.01)
(Continued)

(52) U.S. Cl.
CPC .......... *B29C 64/209* (2017.08); *B29C 64/255* (2017.08); *B29C 64/393* (2017.08);
(Continued)

(58) Field of Classification Search
CPC ... B29C 64/209; B29C 64/255; B29C 64/393; B29C 64/232; B29C 64/223; B29C 64/236; B33Y 10/00; B33Y 30/00; B33Y 50/02
See application file for complete search history.

(56) References Cited

U.S. PATENT DOCUMENTS

2004/0217186 A1* 11/2004 Sachs ..................... B33Y 10/00
239/11
2005/0266149 A1* 12/2005 Henderson ............ B01L 3/0248
118/200
(Continued)

FOREIGN PATENT DOCUMENTS

| DE | 102014114017 A1 * | 3/2016 |
| WO | 2017106199 A1 | 6/2017 |
| WO | 2020128310 A1 | 6/2020 |

OTHER PUBLICATIONS

Foreign Communication from a Related Counterpart Application, International Search Report dated Apr. 6, 2020, International Application No. PCT/FR2019/053129 filed on Dec. 17, 2019.
(Continued)

*Primary Examiner* — Susan D Leong
*Assistant Examiner* — Xinwen Ye
(74) *Attorney, Agent, or Firm* — Conley Rose, P.C.

(57) ABSTRACT

The present invention relates to a system for controlled deposition of a fluid on a substrate and also to a method employing the system. The system comprises:
(Continued)

a nanoinjector, a mechanical resonator fixed to the nanoinjector, the mechanical resonator being adapted to detect contact between the nanoinjector and the substrate, control means of the mechanical resonator comprising:

an excitation means adapted to cause the mechanical resonator to oscillate at an oscillation frequency ($f_i$), a detector means adapted to detect the oscillation of the mechanical resonator, a regulator means adapted to adjust the contact between the nanoinjector and the substrate by controlling the oscillation of the mechanical resonator.

16 Claims, 1 Drawing Sheet

(51) Int. Cl.
*B29C 64/393* (2017.01)
*B33Y 10/00* (2015.01)
*B33Y 30/00* (2015.01)
*B33Y 50/02* (2015.01)

(52) U.S. Cl.
CPC ............... *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2005/0288813 A1* | 12/2005 | Yang | B29C 64/106 700/119 |
| 2017/0025949 A1 | 1/2017 | Joshi et al. | |
| 2018/0297270 A1 | 10/2018 | Liu et al. | |

OTHER PUBLICATIONS

Foreign Communication from a Related Counterpart Application, Written Opinion dated Apr. 6, 2020, International Application No. PCT/FR2019/053129 filed on Dec. 17, 2019.

* cited by examiner

SYSTEM FOR CONTROLLED DEPOSITING OF A FLUID ON A SUBSTRATE

CROSS-REFERENCE TO RELATED APPLICATIONS

The present application is a filing under 35 U.S.C. 371 as the National Stage of International Application No. PCT/FR2019/053129, filed Dec. 17, 2019, entitled "SYSTEM FOR CONTROLLED DEPOSITING OF A FLUID ON A SUBSTRATE," which claims priority to French Application No. 1873249 filed with the Intellectual Property Office of France on Dec. 18, 2018, both of which are incorporated herein by reference in their entirety for all purposes.

The present invention relates to a system for depositing a fluid in such a manner as to obtain nanometric layers.

The invention more precisely concerns a system for controlled deposition of a fluid on a substrate, a method of deposition of a fluid on a substrate, a use of the system for additive fabrication, and a product obtained by the method.

Additive fabrication is a generic term that encompasses diverse techniques based on layer by layer deposition. Two major families of additive fabrication can be distinguished: direct printing techniques and so-called indirect techniques. The former consists in depositing the required material directly onto a substrate. Indirect techniques use a source of energy, such as a laser or a UV lamp to act on a bath of the required material.

Additive fabrication is undergoing strong growth, which considerably modifies how industries are designing their fabrication process. There now exist a plurality of additive fabrication techniques enabling objects to be obtained in a size range between one millimetre and one metre. Efforts have been made to descend below one millimetre.

Known to the person skilled in the art as a technique of indirect printing for depositing a fluid is two-photon polymerization that enables objects to be printed using a laser on a photopolymerizable resin. That resin must be transparent to the wavelength of the laser in order to enable the chemical reaction and generates the polymerization. The resolution of this technique can achieve half the wavelength of the laser, i.e. around one hundred nanometers. This technique has the advantage of being able to fabricate complex objects with great precision, inter alia thanks to the precision of the movement of the laser. However, it remains a technique that is subject to constraints, on the one hand because of the complex device, but also because of constraints on the material used, which must necessarily be photopolymerizable.

Another indirect printing technique is the electron beam assisted growth technique (FEBID) that enables materials to be deposited by bombarding a precursor gas of the required material with electrons in order for it to be deposited on a substrate. This is a technique that can be installed in a scanning electron microscope for example. By focusing the electron beam on a spot of very small size (less than 1 nm), FEBID enables resolutions of the order of one nanometer to be obtained. Even if this technique is characterized by an unequal potential resolution and a possibility of producing complex objects with in situ characterization, it is at present not entirely effected as to the precision of the deposit. In fact, the interaction between the electron beam and the volatile precursor is difficult to control, generating a deposit that is often of a size greater than the accuracy of the focus. Also, it is imperative to find the precursor appropriate to the conditions of use of the device to be able to deposit, a consequence of which is significant reduction of the fabrication material possibilities.

More recently techniques using local probe points (AFM or STM) have enabled resolutions closer to a hundred nanometers to be achieved, as indicated for example in the patent references WO 2017/106199 and US 2017/0259498.

These latter techniques are all direct printing techniques, using the precision of movement and the spatial resolution of the local probe techniques to deposit liquid materials on various substrates. These techniques enable the deposition of very diverse materials with varied solvents:
  different types of polymers;
  biological molecules (peptides, ADN, enzymes . . . );
  various colloids.

In one instance, the AFM point is used like a quill pen. It is dipped before each deposition into a droplet of the deposited material. In another instance, the point is loaded with a small quantity of the required liquid material before deposition. However, even if the resolutions are very high, the two approaches have a major disadvantage, since it is not possible to effect continuous printing in the absence of a reservoir having a sufficient volume. Also, the precision of the deposit obtained is insufficient because there are no parameters enabling control of the flow of material from or through the point.

There therefore exists a need for additive fabrication features layers defined by thicknesses less than 100 nm, capable of depositing a great variety of materials, with adjustable parameters enabling control of deposition, and a sufficiently large reservoir for the uninterrupted fabrication of one or more objects.

To resolve or more of the aforementioned disadvantages, according to the invention, the system for controlled deposition of a fluid on a substrate comprises:
  a nanoinjector comprising:
  a reservoir intended to store said fluid,
  a non-deformable protuberance having an ejection orifice for extraction of said fluid from said reservoir,
  a mechanical resonator fixed to said nanoinjector, said mechanical resonator being adapted to detect contact between said protuberance and said substrate,
  a control means of said mechanical resonator connected to:
  an excitation means of said mechanical resonator adapted to cause said mechanical resonator to oscillate at an oscillation frequency (fi) so that said protuberance oscillates between a low position in which said protuberance is in contact with said substrate and a high position in which said protuberance and said substrate are not in contact, to
  a detector means adapted to detect said oscillation of said mechanical resonator, and to
  a regulator means adapted to adjust said contact between said protuberance and said substrate by controlling said oscillation of said mechanical resonator, said regulator means being connected to a first displacement means for the regulation, adapted at least to movement toward one another or away from one another, along an axis z, said substrate of said nanoinjector.

In the context of the present invention, by fluid is meant a liquid or a gel able to flow under a stress value greater than its threshold stress, the fluid being able or not to contain species in suspension. For example, as fluid there may be used water, a saline solution, a vegetable oil, a silicone oil, an optical lithography resin (SU8 etc.), an ionic liquid, DNA-RNA strands, nanoparticles (colloids or others) of precious metals such as gold and silver, diverse biological materials such as collagen, polysaccharides, proteins, ceramic materials such as zirconia, alumina, aluminium hydroxide, titanium dioxide, provided that the size of the particles allows the fluid to pass through the ejection orifice of the nanoinjector. For example, the ejection orifice may be 7 to 10 times greater than the diameter of the particles contained in the fluid to be deposited.

For example, the species in suspension may be colloidal species, polymer species in solution, etc.

In the context of the present invention by substrate is meant a support that may be plane, structured or have a radius of curvature.

For example, by way of structured support there may be a support having a square shape, a hemisphere shape, a curved shape, a sawtooth shape, a pointed shape, etc.

In the context of the present invention by nanoinjector is meant an injector comprising an ejection orifice having a diameter less than 1 µm.

In the context of the present invention, by ejection orifice is meant an orifice through which the fluid from the nanoinjector is ejected to be thereafter deposited on the substrate, the inside and outside diameters of that orifice being adapted to the deposition that it is wished to obtain.

It is to be noted that, in addition to the inside diameter of the ejection orifice, the outside diameter influences the deposition. In fact, the outside diameter of the ejection orifice influences the fluid meniscus formed between the protuberance and the substrate when the protuberance is brought into contact with the substrate. The ratio between the inside diameter and the outside diameter of the ejection orifice is preferably between 0.8 and 1 inclusive. Deposition of the fluid on the substrate is guaranteed if the meniscus is formed on contact between the protuberance, in particular on contact of a wall situated between the inside diameter and the outside diameter of the ejection orifice, and the substrate. Moreover, with a ratio between the inside diameter and the outside diameter of the ejection orifice between 0.8 and 1 inclusive, the meniscus is more stable in such a manner as to guarantee the deposition between the low position and the high position of the protuberance. The deposition and the stability are favoured if the ratio between the inside diameter and the outside diameter of the ejection orifice is close to 1, that is to say if the wall situated between the inside diameter and the outside diameter of the ejection orifice has the smallest possible thickness.

It is to be noted that the design covers an ejection orifice of variable size. Also, the ejection orifice may have a section of any shape, for example square, rectangular, oval, circular, etc. For example, the protuberance and the nanoinjector may be in one piece so that the protuberance can then form an integral part of the nanoinjector and therefore be in one piece with the reservoir and be of conical shape for example. In this case there may be a nanocapillary having a conical shape at its end via which it is wished to deposit the fluid via the ejection orifice. It is to be noted that the shape need not be conical and may feature an ejection orifice of predefined shape having, for example, a required ejection orifice diameter adjustable as a function of the parameters relating to its design.

It is to be noted that the reservoir may have a longitudinal shape, for example a cylindrical shape, having at each of its ends an opening, a first opening connected directly or indirectly to the protuberance and a second opening through which it is possible to feed the reservoir.

Moreover, it is to be noted that the reservoir and the protuberance of the nanoinjector are not necessarily in one piece and may be dissociated or detached so that the protuberance or the reservoir of the nanoinjector can be interchanged. It is also to be noted that the mechanical resonator, the control means, the excitation means, the detector means and the regulator means are each interchangeable individually.

Moreover, the protuberance may preferably be functionalized.

In the context of the present invention by functionalized protuberance is meant a protuberance having an ejection orifice of which its initial geometry dependent on the geometry of the protuberance is modified by the addition of an element in the protuberance. Thus it is possible to adjust the inside and/or outside diameter of the ejection orifice of the protuberance by adding an element in the protuberance in such a manner as to be able to modify the geometry of the ejection orifice as a function of the required applications, functionalization being effected before the operation of the system commence. For example, different functionalized protuberances may be obtained by the insertion in the protuberance of nanotubes of which one end projects at the surface of the protuberance in such a manner as to constitute the ejection orifice, the nanotube being fixed, using glue for example, to the protuberance. The nanotubes may have different diameters and be made of carbon, boron nitride, molybdenum disulfide, silicon. For example, the nanotube may have ae length between 1 µm and 2 µm inclusive, an outside diameter between 60 nm and 200 nm inclusive, an inside diameter between 5 and 50 nm inclusive. Another example of a functionalized protuberance may be a protuberance covered with a noble material such as gold to protect the fluid from UV rays for example.

The ejection orifice may preferably have an inside diameter between 5 and 300 nm.

In the context of the present invention by non-deformable protuberance is meant a protuberance having stable dimensions under the conditions of use of the system during deposition.

In the context of the present invention by mechanical resonator fixed to said nanoinjector is meant a mechanical resonator in contact with the nanoinjector so that the oscillation of the mechanical resonator is transmitted to the nanoinjector.

In the context of the present invention by control means is meant a means adapted on the one hand to measure the oscillation difference between the oscillation of the mechanical resonator and the set point oscillation transmitted by the excitation means to the mechanical resonator and on the other hand to measure the oscillation variation caused by the contact between the protuberance and the substrate.

For example, as control means there may be an oscilloscope comprising or not a proportional corrector (commonly termed a P corrector), an integral proportional corrector (commonly termed a PI corrector) or a proportional integral derivative corrector (commonly termed a PID corrector) in such a manner as to improve the servocontrol function so that the mechanical resonator oscillates according to the setpoint oscillation.

For example, as excitation means there may be a piezoelectric, magnetic or again acoustic exciter such as a loudspeaker.

For example, as detector means there may be a device comprising an electromechanical microsystem such as an accelerometer, an optical fibre or again a laser.

The detector means may preferably have a stiffness less than or equal to $10^5$ N/m and is a function of the material or materials constituting the nanoinjector.

The materials constituting the nanoinjector must be resistant to the fluid to be deposited. For example, if it is wished to deposit a fluid that contains strong acids such as hydrochloric acid, sulfuric acid, hydrofluoric acid, nitric acid or phosphoric acid on a substrate containing gallium arsenide, silicon dioxide, alumina, zirconia or boron nitride, the nanoinjector may consist of plastic materials such as high-density polyethylene, polypropylene, polyvinyl chloride, polyvinylidene fluoride or again polyether ketone.

In the context of the present invention by regulator means adapted to control the contact between the protuberance and the substrate is meant a means adapted to control the force of interaction of the substrate against the protuberance when there is contact between those two elements.

For example, as regulator means there may be a means comprising a proportional corrector (commonly termed a P corrector), an integral proportional corrector (commonly termed a PI corrector) or a proportional integral derivative corrector (commonly termed a PID corrector).

In the context of the present invention by first displacement means adapted at least to move the substrate closer to or further away from the nanoinjector is meant a means adapted to move the substrate in such a manner as to move it closer to or further away from the nanoinjector along an axis z to control the contact between the substrate and the protuberance.

The first displacement means may be connected to a second displacement means adapted to move the substrate along the axes x, y orthogonal to the axis z to produce a pattern, the three orthogonal axes x, y and z forming a direct trihedron. Thus the first displacement means enables regulation of the contact between the protuberance and the substrate and the second displacement means enables a predefined pattern to be produced.

The first displacement means and the second displacement means are preferably contained in a single displacement system.

The first displacement means and/or the second displacement means preferably comprise(s) a piezoelectric motor having a subnanometric resolution.

The reservoir may preferably be connected to an external reservoir. Thus the volume of fluid to be deposited is adjustable.

Another object of the invention consists in a method of depositing a fluid on a substrate, the method comprising the following steps:
 a) procuring a system as defined previously,
 b) commencing controlled oscillation of said protuberance by excitation of said mechanical resonator by said excitation means to commence oscillation of said mechanical resonator at an oscillation frequency, said oscillation of said mechanical resonator being transmitted to said protuberance,
 c) moving said substrate closer to said protuberance with the aid of said first displacement means so as to produce dynamic contact between said substrate and said protuberance, said protuberance oscillating between a low position in which said protuberance is in contact with said substrate and a high position in which said protuberance and said substrate are not in contact,
 d) detection of said oscillation of said mechanical resonator by said detector means to observe variations of oscillation on contact between said protuberance and said substrate,
 e) with the aid of said regulator means and as a function of the oscillation variations, adjusting the dynamic contact between said protuberance and said substrate so as to form a fluid meniscus between said protuberance and said substrate,
 f) depositing the fluid on said substrate via said ejection orifice during contact between said protuberance and said substrate.

It is to be noted that the system may function in accordance with the configuration in which the nanoinjector is positioned vertically, that is to say when the angle of inclination between the surface on which it is wished to deposit the fluid and the direction in which the nanoinjector is disposed is close to 90°.

It is to be noted that, according to the method of the invention, it is possible for at least two of the steps b), d), e) and f) to be effected simultaneously.

It is to be noted that the deposition may be continuous or discontinuous, that the latter may be in accordance with a predefined pattern or not that is reproducible or not.

In the context of the present invention by dynamic contact is meant discontinuous or intermittent contact at the frequency of oscillation of the mechanical resonator.

It is to be noted that with the aid of the nanoinjector comprising an ejection orifice less than 1 µm it is possible to obtain a deposit having a thickness between 1% and 150% inclusive of the diameter of the ejection orifice.

In the context of the present invention by control by the control means of the mechanical resonator is meant control consisting in analysis of at least the oscillation frequency and potentially also of additional parameters relating to the oscillation such as the frequency, the amplitude phase or again the excitation of the oscillations.

The distance between said low position and said high position may preferably be between 1 nm and 1 µm inclusive.

The system may preferably further comprise a step g) of sweeping the nanoinjector over the substrate in accordance with a trajectory modifiable in real time to produce a first layer.

It is to be noted that the trajectory may be predefined so as to produce a required pattern or to follow any direction.

It is also to be noted that the first layer may be continuous or discontinuous.

The sweeping step g) may preferably be carried out with the constant and predefined contact between the protuberance and the substrate maintained.

The system may preferably further comprise a step of solidification of the first layer. This solidification step enables provision of a dissolution potential and/or degradation potential during the production of the second layer on the first layer. This solidification step may be a subsequent step or carried out in real time during deposition. It is to be noted that this step is optional because there could simply be carried out the deposition of a fluid that is intrinsically hard when it is extracted from the nanoinjector.

It is to be noted that the execution of the solidification step differs according to the properties of the deposited fluid.

The step g) of sweeping the nanoinjector may preferably be carried out at a speed less than 40 µm/s.

It is to be noted that to favour the regularity of the deposit it is possible for example to reduce the sweeping speed and/or to reduce the amplitude of oscillation. Moreover, there may equally be used a fluid comprising species in solution having a small particle size range, that is to say less than ten times the amplitude of the oscillation and less than ten times the thickness of the required deposit.

The system may preferably further comprise the following steps after carrying out the step g) of sweeping the nanoinjector:

h) controlling by said control means of said mechanical resonator at least of said contact between said protuberance and said first layer and said oscillation frequency, i) depositing a second layer on said first layer, j) repeating the foregoing steps h) and i) until a required thickness is obtained.

The control step h) enables a self contact to be obtained between the protuberance and the first layer in order to prevent deterioration of that first layer.

Another object of the invention concerns the use of the system defined above for additive fabrication.

Another object of the invention concerns a product obtained by the method defined above, the product comprising one or more uniform and stable layers having a shape defined by a length greater than or equal to 1 µm.

However, in particular when using the external reservoir connected to the reservoir of the nanoinjector, there could be deposited layers having lengths much greater than 1 µm, for example several kilometres.

It is to be noted that the minimum width of the layer deposited is that of the outside diameter of the protuberance and may therefore be between 0.5 nm and 100 µm inclusive for example, and preferably between 5 nm and 300 nm inclusive. Moreover, it is to be noted that the height of the layer deposited decreases as the viscosity of the fluid decreases, decreases when the speed of sweeping of the nanoinjector decreases, increases if the amplitude of the oscillation increases, and increases if the inside diameter of the protuberance increases.

For example, the maximum ratio between the thickness and the width of the first layer may be approximately equal to 0.4.

The product obtained may preferably comprise a plurality of superposed layers.

It is to be noted that the stability of meniscus between the high position and the low position may be favoured, for example, by reducing the viscosity of the fluid, by increasing the permeability of the protuberance, that is to say by increasing the capacity of the fluid to flow through the protuberance for a given forcing between the reservoir and the meniscus, by increasing the internal section of the protuberance, by increasing the affinity of the fluid for the material of the substrate and for the external material of the protuberance, by using low resonant frequency resonators in order to reduce the frequency of oscillation of the protuberance and to reduce the amplitude of the oscillation whilst being able to detect it.

In the context of the present invention, by given forcing is meant the application of a controlled pressure to the fluid in the reservoir. For example, this forced forcing may be carried out using compressed air, mechanically with a piston/cylinder system or again electrically by applying a voltage between the substrate and the nanoinjector.

Thus it is possible with the aid of the invention to print in a localized manner to produce connections of nanometric or micrometric circuits.

Figure 1:
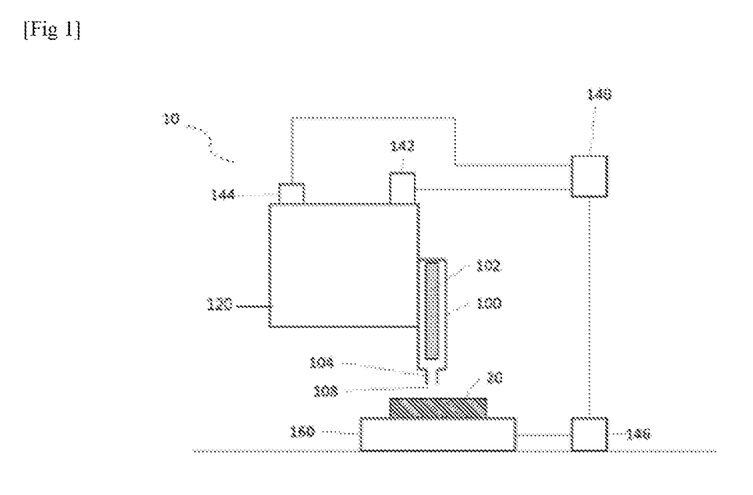
FIG. 1 which represents a system in accordance with a preferred embodiment of the invention, FIG. 2 which represents a diagram showing steps that can be carried out for the system according to the preferred embodiment of the invention to function.

The invention will be better understood on reading the following description given by way of example only and with reference to the following appended figures:

FIG. 1 shows a system 10 for controlled deposition of a fluid on a substrate 20.

For example, as fluid there may be any type of fluid such as an SU8 2002 solution, a SU 8 2010 solution, an ionic liquid, a gel, or against a paste.

The substrate used here is a flat substrate having a roughness less than one nanometer.

The FIG. 1 system comprises a nanoinjector 100 comprising a reservoir 102 intended to store the fluid and a non-deformable protuberance 104 having an ejection orifice 108 for extracting the fluid from the reservoir 102.

It is to be noted, for example, that the reservoir 102 and the nanoinjector 100 of nanometric size may be produced by laser pulling, using the Sutter Instruments P-2000 laser puller, a glass capillary of cylindrical shape having a length approximately equal to 2 cm and a conical thread 2 mm long. After laser pulling the inside diameter of the capillary varies from 0.5 mm to a few tenths of nanometers at the apex. In this configuration, the nanoinjector 100 features a tube intended to store the fluid. The tube has a conical end into which is inserted a nanotube featuring a ejection orifice 108 for functionalizing the protuberance 104. The tube may then be made of glass and have an inside diameter approximately equal to 20 nm. The nanotube may be a carbon nanotube approximately 1 µm long and having an outside diameter approximately equal to 20 nm and an inside diameter approximately equal to 1 nm.

It is to be noted that, to increase the volume of fluid to be deposited made available, the reservoir 102 may be connected to an external reservoir (not shown in FIG. 1).

The system 10 further comprises a mechanical resonator 120 fixed to the nanoinjector 100.

The mechanical resonator 120 may take the form of a tuning fork the body of which is screwed at its base to a block that is able to be moved along the three axes of space by a system of micrometric screws. In this configuration, the nanoinjector 100 is stuck, for example using glue, to a lug of the tuning fork so that the ejection orifice 108 is directed downward, toward the substrate 20, which is positioned on a piezoscanner. The body of the nanoinjector 100, used as the reservoir 102, is filled with the fluid to be deposited with the aid of a micrometric syringe, the fluid also filling the thread by capillarity. For example, the tuning fork may comprise a branch that may be made of aluminium and have a diameter approximately equal to 1 cm and a length approximately equal to 10 cm. The nanoinjector 100 may then be fixed to the free end of the tuning fork. The tuning fork is designed so as to be able to reproduce the same geometry and the same dimensional ratio of the various elements constituting the quartz tuning forks generally used in AFM.

It is to be noted that it is preferable for the mechanical resonator 120 to have a quality factor high enough for the regulation of the contact to be possible at the desired frequency shift. For example, there may be used a mechanical resonator 120 having a quality factor of the order of 10000 so as to have a ratio between the resonance frequency and the quality factor between 0.1 and 20 inclusive.

The system 10 further comprises a control means 148 of the mechanical resonator 120. This control means 148 enables control of the deposition of fluid on the substrate 20.

The control means 148, which is an oscillator comprising a first PID corrector 1 in this embodiment, is in particular connected to an excitation means 142 to excite the mechanical resonator 120 to cause the mechanical resonator 120 to oscillate at an oscillation frequency fi so that the protuberance 104 oscillates between a low position in which the protuberance 104 is in contact with the substrate 20 and a high position in which the protuberance 104 and the substrate 20 are not in contact. As excitation means 142 there is a piezoelectric exciter in this embodiment. This piezoelectric exciter is stuck to the mechanical resonator 120.

The distance between the low position and the high position depends on all the characteristics of the system, for example on the nature of the protuberance, on the fluid to be deposited, on the oscillation frequency, on the nature of the substrate 20 or again on the speed of movement of the substrate 20.

The control means 148 is furthermore connected to a detector means 144 adapted to detect the oscillation of the mechanical resonator 120 so as to read off the response of the mechanical resonator 120 to the excitation by the excitation means 142. In this embodiment the detector means 144 is an accelerometer that is also stuck to the mechanical resonator 120.

The control means 148 is furthermore connected to a regulator means 146 adapted to adjust the contact between the protuberance 104 and the substrate 20 by controlling the oscillation of the mechanical resonator 120.

The regulator means 146 is a second PID corrector 2 and enables adjustment of the contact with the aid of the first displacement means 160 to which it is connected and which is adapted to move the substrate 20 and the nanoinjector 100 closer together or further apart along an axis z. Moreover, the first displacement means 160 is connected to a second displacement means which is adapted to move the substrate 20 along axes x and y, the three axes x, y and z being orthogonal and forming a direct trihedron, to enable any atom to be produced on the surface of the substrate. To guarantee high accuracy the first displacement means 160 and/or the second displacement means comprise(s) a piezoelectric motor having a subnanometric resolution. In particular, the first displacement means 160 and the second displacement means may be parts of a single displacement system. The single displacement system may, for example, be the piezoscanner on which the substrate 20 is deposited. The latter has a maximum travel approximately equal to 50 µm.

Moreover, a video camera focused on the ejection orifice 108 may moreover be used to observe the movement closer together of the nanoinjector 100 and the substrate 20.

It is to be noted that in this embodiment the angle of inclination of the substrate between the plan of movement of the piezoscanner and the plane of the substrate is less than 5°.

The method of using the system shown in FIG. 1 to deposit the fluid on the substrate 20 is indicated hereinafter with reference to FIG. 2.

Figure 2:
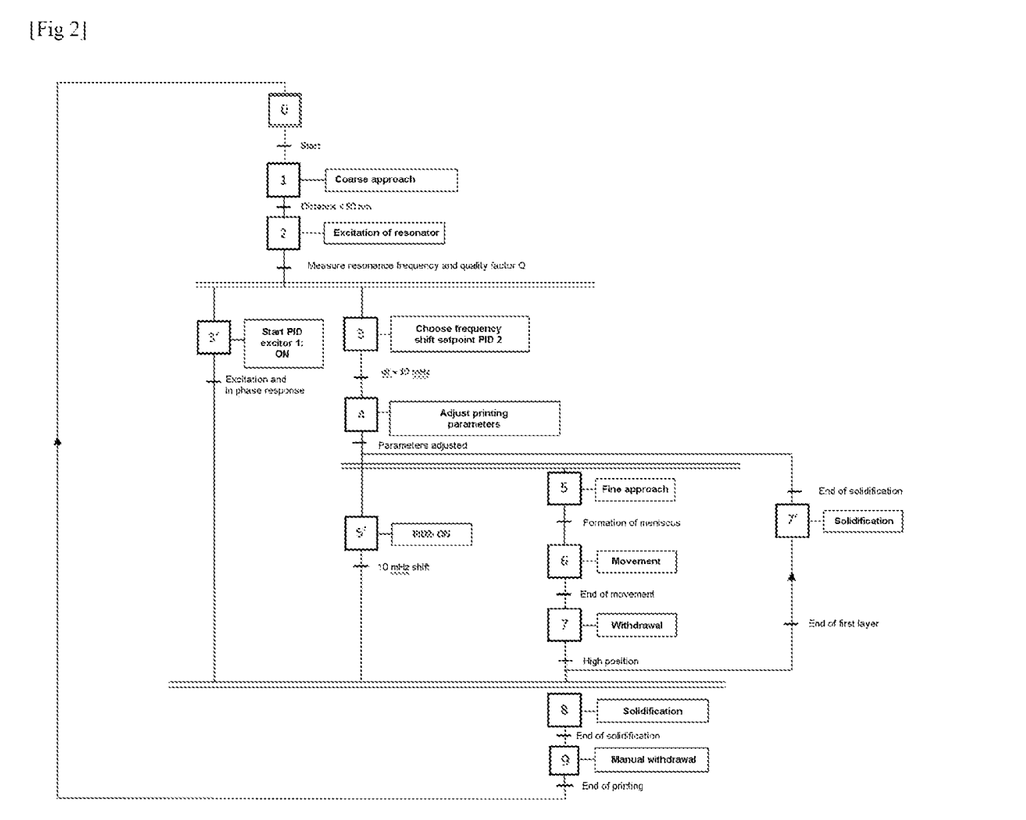

In a preliminary and optional step, step 1 in FIG. 2, using the video camera focused on the ejection orifice 108 using the micrometric screw of the tuning fork, which is the mechanical resonator 120, the protuberance 104 is moved closer to the substrate 20 to a distance less than 50 µm, which corresponds to the maximum travel of the piezoscanner, the latter enabling subsequent movement closer together of these two elements.

In a following step, step 2 in FIG. 2, the protuberance 104 commences controlled oscillation by excitation of the tuning fork by the piezoelectric exciter to cause the tuning fork to oscillate at a frequency of oscillation fi. In this way the oscillation of the tuning fork is transmitted to the protuberance 104.

Accordingly, in another step, step 3' in FIG. 2, it is possible to measure the resonance of the system consisting of the tuning fork, the piezoelectric exciter and the accelerometer in such a manner as to determine the frequency of resonance of the tuning fork and its quality factor. The tuning fork is excited mechanically by the piezoelectric exciter at its resonance in normal oscillation at frequency f0. The oscillation is detected by the accelerometer with a resonance sensitivity up to an amplitude of 0.5 nm, corresponding in this case to the minimum amplitude of oscillation when the system is functioning, that is to say corresponding to the minimum distance between the high position and the low position.

It is to be noted, for example, that the piezoelectric exciter may be fed with an electric signal the frequency of which corresponds to its mechanical excitation frequency. The frequency of this electric signal is adjusted by the first PID corrector 1 to control the oscillation of the tuning fork so that the response of the tuning fork detected by the accelerometer is in phase with the signal from the piezoelectric exciter so that the tuning fork oscillates according to the oscillation of the piezoelectric exciter. The setpoint of this feedback loop is therefore that the phase difference between the oscillation of the piezoelectric exciter and that of the tuning fork is zero. The tuning fork is then in phase with the piezoelectric exciter. The tuning fork is therefore excited at its resonance frequency, which depends on its mechanical properties but also on the interactions with its environment.

In another step, step 3 in FIG. 2, which may be executed at the same time as step 3', it is possible to predefine the phase shift of setpoint oscillation of the second PID corrector 2, that phase shift corresponding to the phase shift induced by the predefined contact between the protuberance and the substrate 20. For example, this phase shift may be 10 mHz.

Thereafter, in another step, step 4 in FIG. 2, the substrate 20 is moved closer to the protuberance 104 with the aid of the piezoscanner so as to produce a dynamic contact between the substrate 20 and the protuberance 104. The protuberance 104 therefore oscillates between a low position in which it is in contact with the substrate 20 and a high position in which it is not in contact with the substrate 20.

It is to be noted that, in the meantime, the oscillation of the tuning fork is detected by the accelerometer to observe oscillation variations upon contact between the protuberance 104 and the substrate 20.

Accordingly, on contact between the protuberance 104 and the substrate 20 the forces applied to the assembly consisting of the tuning fork and the nanoinjector 100 are modified. This modification creates a modification of the resonance frequency and therefore of the excitation frequency of the piezoelectric exciter, which is maintained at the resonance frequency of the tuning fork. For example, it is then determined that the dynamic contact is achieved when the resonance frequency of the assembly consisting of the tuning fork and the nanoinjector 100 is modified by 10 mHz, as selected in step 3, relative to the excitation frequency of the piezoelectric exciter. It is therefore possible to verify that the system is not suffering temporal drift of the resonance frequency before proceeding to subsequent steps.

Thereafter, in step 5 in FIG. 2, with the aid of the second PID corrector 2 as a function of the oscillation variations, the dynamic contact between the protuberance 104 and the substrate 20 is adjusted in such a manner as to form a meniscus of fluid between the protuberance 104 and the substrate 20. The substrate 20 is placed on the three-axis piezoscanner with a sub-nanometric resolution in movement (for example, the piezoscanner used may be the Tritor101 Piezosystemjena) under the nanoinjector 100. The second PID corrector 2 controls the fine approach between the substrate 20 placed on the piezoscanner and the nanoinjector 100 thanks to a feedback loop, until the contact between the protuberance 104 and the substrate 20 is achieved for the setpoint phase shift of the resonance frequency of 10 mHz chosen previously. The rigidity of the tuning fork enables a controlled approach and makes it possible to defend against rapid jump-type effects of the protuberance 104 in contact with the substrate 20 because of the meniscus between the protuberance 104 and the substrate 20.

In another step the fluid is deposited on the substrate 20 via the ejection orifice 108 during contact between the protuberance 104 and the substrate 20.

Thereafter, in a subsequent step, step 6 in FIG. 2, by moving the substrate 20 relative to the nanoinjector 100 the nanoinjector 100 is swept over the substrate 20 along a trajectory that can be modified in real time to produce a first layer.

The deposition design is produced by moving the substrate 20 whilst maintaining the interaction with the nanoinjector constant thanks to the second PID corrector 2, in a step 5' in FIG. 2, regulates and controls the contact between the protuberance 104 and the substrate 20. The detection in real time of the interaction between the nanoinjector 100 and the surface of the substrate 20 makes it possible to prevent uncontrolled damage to the substrate 20 and to the nanoinjector 100.

A setpoint of the order of 10 mHz, for example, may be kept for the second PID corrector 2 or increased to a few Hz provided that the protuberance 104 resists this kind of forces of intermittent contact with the substrate 20. A trajectory for the protuberance 104 is defined relative to the substrate 20 by electronic control of the piezoscanner connected to the second PID corrector 2. The speed at which this trajectory is travelled is also defined. Thus the sweeping is carried out with the constant and predefined contact between the protuberance 104 and the substrate 20 maintained. The piezoscanner then follows the setpoint trajectory at a setpoint speed less than 40 μm/s and maintaining the frequency shift of 10 mHz with the aid of the second PID corrector 2 and the piezoscanner. The limit speed not to be exceeded is conditioned by the stability of the meniscus during oscillation between the low position and the high position.

In another step, step 7' or 8 in FIG. 2, it is possible to solidify the first layer. For example, when a polymerizable ink is deposited, the choice may be made to expose the first layer obtained to UV light before proceeding to deposit a second layer thereon. This solidification step may be carried out simultaneously with deposition or afterwards.

When the deposit is finished, in another step, step 7 in FIG. 2, the substrate 20 may be withdrawn or moved away from the nanoinjector 100 by using the piezoscanner in such a manner as to interrupt the contact between them.

Thereafter, step 9 in FIG. 2, the protuberance 104 may be moved coarsely, away from the substrate 20 using the micrometric screws of the tuning fork, thereafter to withdraw the substrate 20 on which the first layer has been deposited.

With this kind of system and using this kind of method, employing:
   a nanoinjector comprising a reservoir having a volume of 10 mm$^3$ (reservoir of cylindrical shape having a section approximately equal to 0.5 mm$^2$ and a length approximately equal to 2 cm) and containing an SU8 2002 solution as fluid and having a protuberance functionalized by the insertion of a carbon nanotube having an ejection orifice having an inside diameter approximately equal to 50 nm and an outside diameter approximately equal to 180 nm,
   a tuning fork having a quality factor approximately equal to $1.4 \cdot 10^4$ and oscillating at a frequency approximately equal to 1.5 kHz and causing the protuberance to oscillate between a high position and a low position, each of those positions being a distance less than 10 nm apart,
   a silicon substrate,
   a speed of movement of the substrate approximately equal to 0.125 μm/s, a regular and stable layer is obtained having a thickness approximately equal to 30 nm and a width approximately equal to 150 nm over a length of several micrometers.

Under the same conditions as before, with a speed of movement of the substrate approximately equal to 0.5 μm/s, a regular and stable layer of ink is obtained having a thickness approximately equal to 5 nm and a width approximately equal to 150 nm.

Under the same conditions as indicated above, with as nanoinjector a nanoinjector having a protuberance functionalized by the insertion of a carbon nanotube having an ejection orifice having an inside diameter approximately equal to 1 nm and an outside diameter approximately equal to 20 nm, a regular and stable layer of ink is obtained having a thickness approximately equal to 700 pm and a width approximately equal to 20 nm over a length of several micrometers.

In another example, using:
   a nanocapillary as nanoinjector comprising a reservoir having a volume of 3 mm$^3$ and containing an SU8 2010 solution and having no functionalized protuberance, but having an ejection orifice having an inside diameter approximately equal to 200 nm,
   a tuning fork having a quality factor approximately equal to $1.4 \cdot 10^4$ and oscillating at a frequency approximately equal to 1.5 kHz and causing the protuberance to oscillate between a high position and a low position, each of those positions being a distance approximately equal to 1 nm apart,
   a silicon substrate,
   a speed of movement of the substrate less than 40 μm/s, a regular and stable layer of ink is obtained having a thickness approximately equal to 35 nm and a width approximately equal to 200 nm over a length of several micrometers, approximately 100 μm.

In a further example, using:
   a nanoinjector comprising a reservoir having a volume of 10 mm$^3$ and containing an ionic solution (for example that known as Bmim PF6) as fluid and having a protuberance functionalized by the insertion of a carbon nanotube having an ejection orifice having an inside diameter approximately equal to 60 nm and an outside diameter approximately equal to 5 nm,
   a tuning fork having a quality factor approximately equal to $1.4 \cdot 10^4$ and oscillating at a frequency approximately equal to 1.5 kHz and causing the protuberance to oscillate between a high position and a low position, each of these positions being a distance less than 50 nm away, a silicon substrate, a speed of movement of the substrate between 1 and 4 µm/s inclusive, a regular and stable layer of ink is obtained having a thickness approximately equal to 0.5 nm and a width approximately equal to 20 nm.

Using examples of this kind and predefined trajectories, complex shapes can be produced such as sinusoids or spirals or circles.

Additive fabrication may be used to produce objects in three dimensions to order. In fact, layers can also be stacked on top of one another, the first layer on which a second has just been deposited possibly having been solidified beforehand by the use of any solidification process. For example, around ten layers may be stacked successively each having a thickness approximately equal to 100 nm so as to produce a stack having the shape of a circle and having a total thickness approximately equal to 1.5 µm high and 8 µm diameter.

Two layers may also be made to cross over in such a manner as to form a cross with a point of intersection having a thickness of 300 nm, equivalent to twice 150 nm, which may be the thickness of a single layer, each layer having a thickness approximately equal to 100 nm.

The invention has been shown and described in detail in the above description and the drawings. The above description must be considered as illustrative and given by way of example and without limiting the invention to this single description. Numerous variant embodiments are possible.

The invention claimed is:

1. System for controlling deposition of a fluid on a substrate, said system comprising:
   a nanoinjector comprising:
   a reservoir intended to store said fluid,
   a non-deformable protuberance having an ejection orifice for extraction of said fluid from said reservoir,
   a mechanical resonator comprising a tuning fork fixed to said nanoinjector, said tuning fork being adapted to detect contact between said protuberance and said substrate,
   a control means of said mechanical resonator connected to:
   an excitation means of said mechanical resonator adapted to cause said mechanical resonator to oscillate at an oscillation frequency (fi) so that said protuberance oscillates between a low position in which said protuberance is in contact with said substrate and a high position in which said protuberance and said substrate are not in contact, to
   a detector means adapted to detect said oscillation of said mechanical resonator, and to
   a regulator means adapted to adjust said contact between said protuberance and said substrate by controlling said oscillation of said mechanical resonator, said regulator means being connected to a first displacement means for the regulation, adapted at least to movement toward one another or away from one another, along an axis z, said substrate of said nanoinjector; and
   wherein the tuning fork has a ratio between the resonance frequency and the quality factor between 0.1 and 20 inclusive.

2. System according to claim 1, in which said protuberance is functionalized.

3. System according to claim 1, in which said ejection orifice has an inside diameter between 5 and 300 nm inclusive.

4. System according to claim 1, in which said first displacement means is connected to a second displacement means adapted to displace said substrate along axes x, y orthogonal to said axis z for the production of a pattern, said three orthogonal axes x, y and z forming a direct trihedron.

5. System according to claim 4, in which the first displacement means and the second displacement means may be included in a single displacement system.

6. System according to claim 1, in which said first displacement means and/or said second displacement means comprise(s) a piezoelectric motor.

7. System according to claim 1, in which said reservoir is connected to an external reservoir.

8. System according to claim 1, wherein the detector means comprises an accelerometer.

9. System according to claim 1, wherein the tuning fork comprises aluminum.

10. Method of depositing a fluid on a substrate, said method comprising the following steps:
    a) procuring the system as defined in accordance with claim 1,
    b) commencing controlled oscillation of said protuberance by excitation of said mechanical resonator by said excitation means to commence oscillation of said mechanical resonator at an oscillation frequency (fi), said oscillation of said mechanical resonator being transmitted to said protuberance,
    c) moving said substrate closer to said protuberance with the aid of said first displacement means so as to produce dynamic contact between said substrate and said protuberance, said protuberance oscillating between the low position in which said protuberance is in contact with said substrate and the high position in which said protuberance and said substrate are not in contact,
    d) detection of said oscillation of said mechanical resonator by said detector means to observe variations of oscillation on contact between said protuberance and said substrate,
    e) with the aid of said regulator means and as a function of the oscillation variations, adjusting the dynamic contact between said protuberance and said substrate so as to form a fluid meniscus between said protuberance and said substrate,
    f) depositing the fluid on said substrate via said ejection orifice during contact between said protuberance and said substrate.

11. Method according to claim 10, further comprising a step g) of sweeping said nanoinjector over said substrate along a trajectory modifiable in real time to produce a first layer.

12. Method according to claim 11, in which said sweeping step g) is carried out with said constant and predefined contact between said protuberance and said substrate maintained.

13. Method according to claim 11, further comprising a step of solidification of said first layer.

14. Method according to claim 11, in which the step g) of sweeping said nanoinjector is carried out at a speed less than 40 µm/s.

15. Method according to claim 11, further comprising the following steps: h) controlling by said control means of said mechanical resonator at least of said contact between said protuberance and said first layer and said oscillation frequency (fi), i) depositing a second layer on said first layer, j) repeating the foregoing steps h) and i) until a required thickness is obtained.

16. Method according to claim 10, in which the distance between said low position and said high position is between 1 nm and 1 μm inclusive.

* * * * *